3,267,785
FLYING SAW
Hans Pferdekämper, Dusseldorf, Germany, assignor to Schloemann Aktiengesellschaft, Dusseldorf, Germany
Filed Dec. 15, 1964, Ser. No. 418,518
Claims priority, application Germany, Dec. 18, 1963, Sch 34,346
4 Claims. (Cl. 83—310)

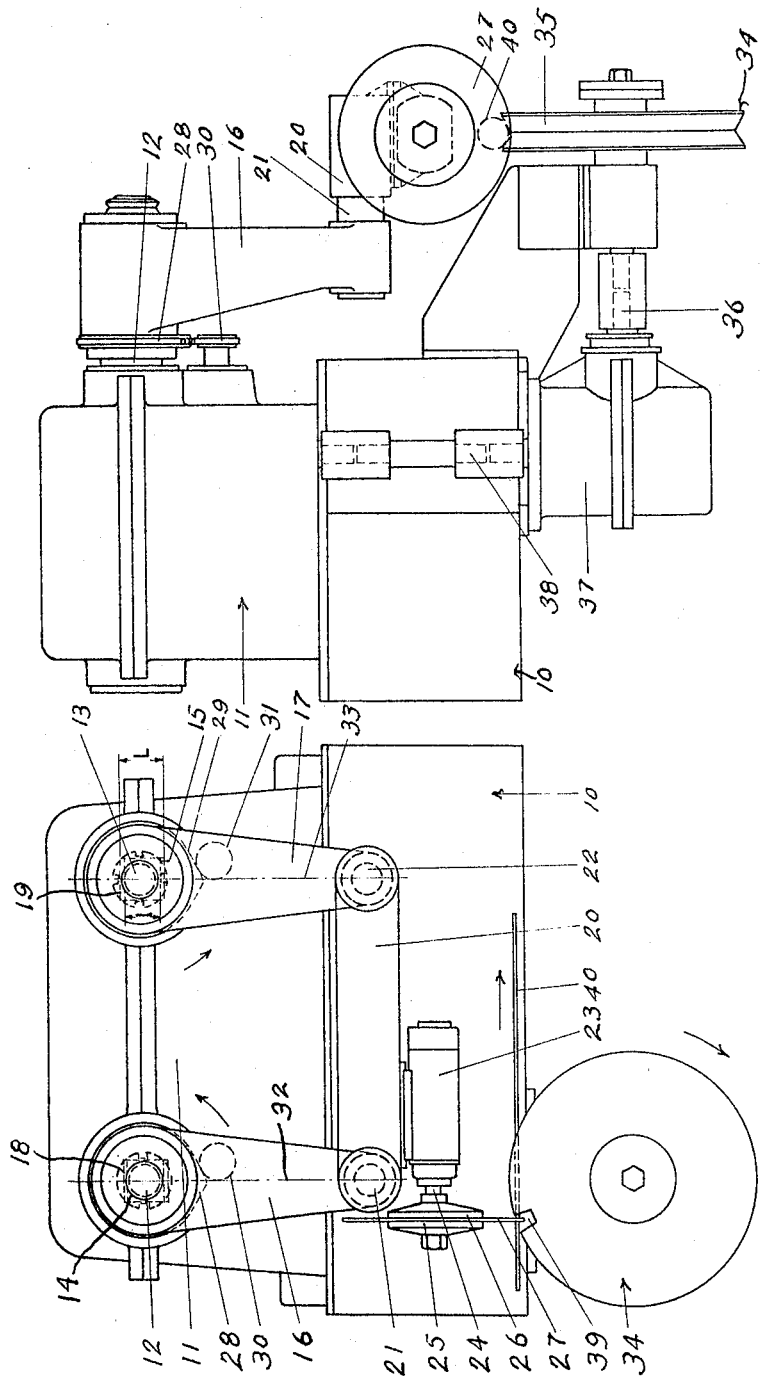

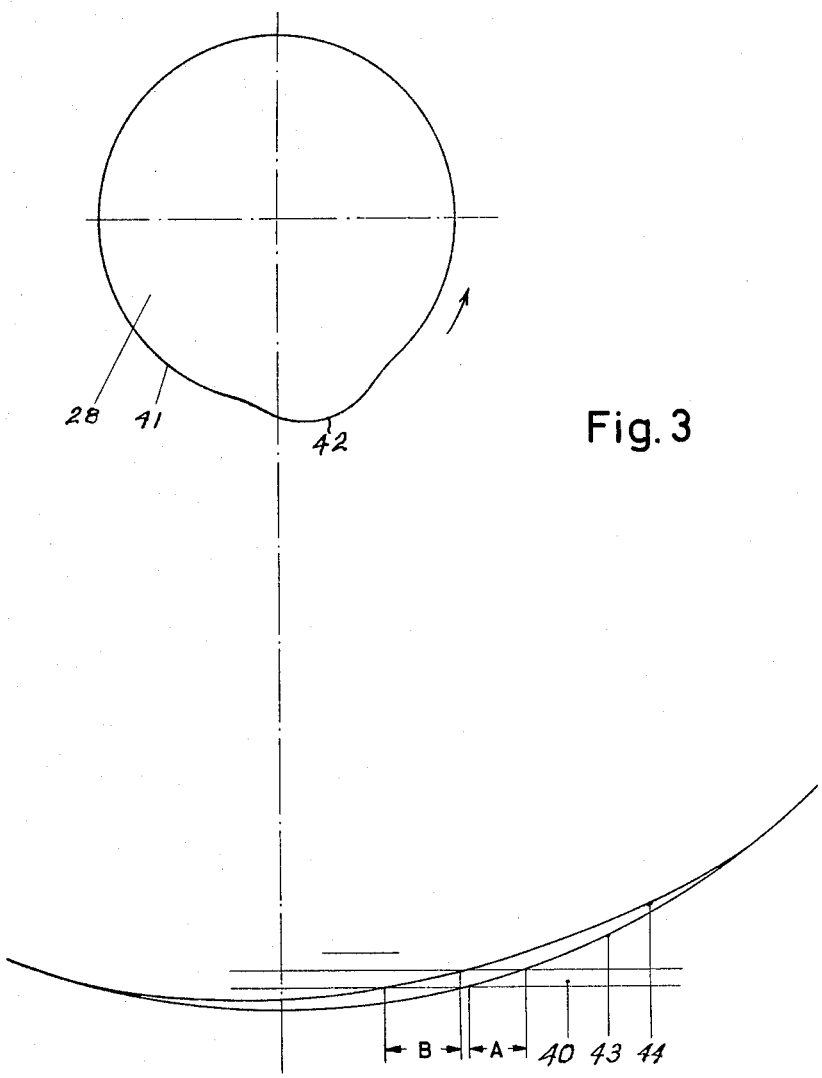

This invention relates to metal working, and more particularly to a flying saw apparatus for severing a continuously moving workpiece.

Heretofore, flying saws for severing continuously moving stock have been utilized, and in general these saws having included a pair of crank arms rotating in the same direction with the saw blade and drive means therefor supported at the ends of the arms remote from the crankshafts. Obviously, in severing continuously moving stock or workpieces, the saw must travel at the same rate of speed as the stock or workpiece during the cutting operation, and therefore the angular velocity of the crank arms must be such as to provide this rate of travel during the cutting operation. It is also necessary that the saw blade remain in contact with the work a sufficient period of time to permit a clean cut, and this time period will of course vary depending on the dimensions of the workpiece to be cut. In the interest of maintaining minimum space requirements, it is advantageous to keep the crank arms as short as possible, consistent with providing the necessary cutting time, and of course such cutting time is reduced as the length of the crank arms is shortened. Where it is necessary to provide a longer cutting time, longer crank arms must be utilized, and this of course results in increasing the size of the apparatus, and also introduces additional inertia to the moving parts, and with such structures it is not possible to adapt the same for cutting operations where the stock or workpiece travels at a relatively high rate of speed.

It is accordingly an object of the invention to provide a flying saw apparatus which is so constructed as to provide the desired cutting time with the stock moving at a relatively high rate of speed, and at the same time maintain the over-all dimensions of the apparatus, as well as the inertia factors within acceptable limits.

A further object of the invention is the provision of a flying saw apparatus for severing a continuously moving workpiece in which a saw is mounted on a pair of rotating crank arms, and in which the crank arms may be moved longitudinally during rotation thereof to provide substantially the same results as would be provided if longer crank arms were utilized.

A still further object of the invention is the provision of a flying saw apparatus for severing a continuously moving workpiece in which a saw is mounted on continuously rotating crank arms, and in which the crank arms are moved longitudinally during rotation thereof to provide a sufficient time for the saw to satisfactorily sever relatively rapid moving workpieces.

Another object of the invention is the provision of a flying saw apparatus for severing a continuously moving workpiece, in which a saw is carried by continuously rotating crank arms, such crank arms being nonrotatably mounted on crank shafts, but mounted for longitudinal movement of the crank arms with respect to the crank shafts, there being a cam provided on each crank arm and a fixed cam follower mounted on the machine frame for engagement with the cams to thereby move the crank arms longitudinally during rotation thereof, thereby changing the effective lever arms.

Further objects and advantages of the invention will be apparent from the following description taken in conjunction with the accompanying drawings, wherein:

FIG. 1 is a front elevational view of a flying saw apparatus constructed in accordance with this invention;

FIG. 2, a side elevational view of the apparatus shown in FIG. 1; and,

FIG. 3, an enlarged diagrammatic view showing the path followed by the saw of this invention as the result of longitudinal movement of the crank arms, and compared to the path which would be followed with fixed crank arms.

With continued reference to the drawings, and particularly FIGS. 1 and 2, there is shown a flying saw apparatus constructed in accordance with this invention, and which may well comprise a base frame 10 having a housing 11 mounted thereon, this housing serving to rotatably mount a pair of spaced, parallel crank shafts 12 and 13 which may be driven in any suitable manner. The crank shafts 12 and 13 project outwardly of the housing 11, and the outer ends of the crank shafts 12 and 13 are square or rectangular in cross section, as shown at 14 and 15, respectively, and such square or rectangular ends have a dimension 1, as shown in FIG. 1.

A pair of crank arms 16 and 17 are provided at one end with rectangular apertures, as shown at 18 and 19, respectively, and such apertures have a dimension L in the longitudinal direction of the crank arms 16 and 17. A link 20 is pivotally connected at 21 and 22 to the opposite ends of the crank arms 16 and 17, and a suitable drive motor 23 is mounted on the link 20, and is provided with a drive shaft 24 having mounting flanges 25 and 26 thereon for securing a saw blade 27 to the drive shaft 24, for rotation therewith.

A suitable cam 28 is fixed to the crank arm 16 for rotation therewith, and an identical cam 29 is fixed to the crank arm 17 for rotation therewith. A cam follower 30 is mounted on the housing 11, and engages the cam 28, while a similar cam follower 31 is mounted on the housing 11 and engages the cam 29. Consequently, it will be seen that upon rotation of the crank arms 16 and 17, engagement of the cams 28 and 29 with the followers 30 and 31 will result in moving the crank arms 16 and 17 longitudinally along the center lines 32 and 33 thereof, and the extent of such movement will be determined by the shape of the cams 28 and 29, the maximum possible movement being the difference between the dimension L and the dimension 1.

As indicated above, the connections between the polygonal ends 14 and 15 of the crankshafts 12 and 13 and the arms 16 and 17 provides a driving connection for rotating the arms 16 and 17 while permitting longitudinal movement of the arms 16 and 17 with respect to the crankshafts 12 and 13. This is by reason of the fact that the widths of the rectangular apertures 18 and 19 in the arms 16 and 17 transversely of such arms or along the minor axes of the rectangular apertures 18 and 19 is equal to the corresponding dimension of the square or rectangular ends 14 and 15 on the crankshafts 12 and 13, which, of course, serves to prevent relative rotation between the crankshafts 12 and 13 and the arms 16 and 17. Longitudinal movement of the arms 16 and 17 with respect to the crankshafts 12 and 13 is permitted during rotation of the arms 16 and 17 by reason of the fact that the longitudinal or major dimension of the rectangular apertures 18 and 19 in the arms 16 and 17 is greater than the corresponding dimension of the polygonal ends 14 and 15 on the crankshafts 12 and 13. The longitudinal or major dimension of the rectangular apertures 18 and 19 in the arms 16 and 17 is indicated on FIG. 1 of the drawing by L, while the corresponding dimension of the polygonal ends 14 and 15 of the crankshafts 12 and 13 is indicated by 1. Consequently, as stated above, the maximum possible longitudinal movement of the arms 16 and 17 with respect to the crankshafts 12 and 13 will be the difference between the dimension L and the dimension 1.

Cams 28 and 29 are fixed to the arms 16 and 17 for rotation therewith and also for longitudinal movement with such arms 16 and 17 and as clearly shown in FIGS. 1 and 2, the cams 28 and 29 engage the cam followers 30 and 31 fixed on the housing 11 of the machine. The force of gravity will maintain the cams 28 and 29 in engagement with the cam followers 30 and 31 during rotation of the arms 16 and 17 and as a result, the path of movement of the pivotal connections 21 and 22 on the outer ends of the arms 16 and 17 will be circular during engagement of the circular portion of the cams 28 and 29 with the followers 30 and 31, but during engagement of the raised portion 42 of the cams 28 and 29 with the followers 30 and 31, the path of movement of the pivotal connections 21 and 22 will be flattened as clearly shown in FIG. 3 of the drawing, since engagement of the raised or nose portion 42 on the cams 28 and 29 with the followers 30 and 31 will result in moving the arms 16 and 17 longitudinally thereof with respect to the crankshafts 12 and 13, such movement as described above, being permitted by the difference between dimensions L and 1.

A workpiece support in the form of a wheel 34 having a groove 35 in the periphery thereof is rotatably mounted on the base 10 below the saw 27, and the wheel 34 is connected through a shaft 36 with a suitable gear box 37, which in turn is connected through a shaft 38, with the drive mechanism for the crank shafts 12 and 13, with the result that the wheel 34 rotates in timed relation to the rotation of the crank shafts 12 and 13 and the crank arms 16 and 17 carried thereby. The work support wheel 34 is provided with a transverse notch 39 in the periphery thereof, and such notch serves to permit passage of the saw blade 27 during the cutting operation. A continuously moving workpiece 40 is received in the groove 35 and supported by the wheel 34, and the workpiece 40 moves in the direction of the arrow shown in FIG. 1. The crank arms 16 and 17, as well as the wheel 34, also rotate in the direction shown by the arrows in FIG. 1.

With particular reference to FIG. 3, the cam 28 is shown to an enlarged scale, and the cam surface 41 is provided with a raised portion 42, and of course the surface 41 as well as the raised portion 42 engages the cam follower 30 during rotation of the crank arm 16. In FIG. 3, the workpiece moving in the direction of the arrow is indicated by 40, and the arc 43 is the path that the saw blade 27 would travel if the crank arms merely rotated without being subjected to longitudinal movement. Consequently, for this movement of the saw blade which is comparable to that found in prior art flying saw machines, the time available for making the cut through the workpiece 40 is indicated by the distance A. By utilizing the structure of this invention, the engagement of the raised portion 42 of the cam 28 with the follower 30 and of course a similar engagement of the cam 29 on the crank arm 17 will result in changing the path of the saw to that shown by the line 44, and this results in engagement of the saw blade 27 with the workpiece 40, over a distance B, which as will be seen is approximately 40% greater than the distance A.

It will accordingly be obvious that as a result of this invention, the time of engagement between the saw blade and the workpiece is materially increased, thereby permitting a suitable cutting operation, while still maintaining the speed of travel of the workpiece at a relatively high rate, and consequently suitable cutting operations of this type may be performed while maintaining the size of the apparatus as well as the inertia factors within acceptable limits.

It will be obvious to those skilled in the art that various changes may be made in the invention without departing from the spirit and scope thereof, and therefore the invention is not limited by that which is shown in the drawings and described in the specification, but only as indicated in the appended claims.

What is claimed is:

1. A flying saw apparatus for severing a continuously moving workpiece, said apparatus comprising a frame, a pair of spaced parrallel crank shafts rotatably mounted in said frame and projecting outwardly, a unitary crank arm non-rotatably mounted at one end on the projecting end of each shaft, each complete arm being longitudinally slidable transversely of the axis of each shaft, a link pivotally connecting the opposite ends of said arms, a motor mounted on said link and having a drive shaft, a saw mounted on said drive shaft, the plane of said saw being substantially parallel to the axes of said crankshafts, means for supporting a workpiece for movement transversely of the plane of said saw, and automatic means for moving said complete arms longitudinally during each rotation of said crankshafts, whereby said saw will move into engagement with and through said moving workpiece to sever the same, the rotation of said crank arms causing said saw to move with said workpiece and the longitudinal movement of said complete crank arms during each rotation of said crankshafts serving to increase the radius of curvature of the path of said saw substantially at the moment of and during engagement with said workpiece to increase the time during which the saw is in engagement with the workpiece.

2. A flying saw apparatus as defined in claim 1, in which the projecting end of each crankshaft is square in cross section and in which said one end of each crank arm is provided with a rectangular opening receiving said square end, the major axis of each opening being disposed longitudinally of each crank arm.

3. A flying saw apparatus as defined in claim 1, in which the means for moving said crank arms longitudinally comprises a cam fixed to each crank arm for rotation therewith and a cam follower fixed to said frame and engaging each cam, whereby rotary movement of each cam in engagement with each follower will move each crank arm longitudinally in accordance with the contour of each cam.

4. A flying saw apparatus as defined in claim 1 in which the projecting end of each crankshaft is rectangular in cross section and in which said one end of each crank arm is provided with a rectangular opening receiving said rectangular end, the major axis of each opening being disposed longitudinally of each crank arm and of a length greater than the length of the corresponding axis of each rectangular end.

References Cited by the Examiner
UNITED STATES PATENTS

| | | | |
|---|---|---|---|
| 2,332,013 | 10/1943 | Rudert et al. | 83—310 |
| 2,645,001 | 7/1953 | Rodder | 83—327 X |
| 2,833,024 | 5/1958 | Boehm et al. | 83—327 X |

WILLIAM S. LAWSON, *Primary Examiner.*